INVENTOR
THEODORE ROBERT COBURN
BY
*William Frederick Werner*
ATTORNEY

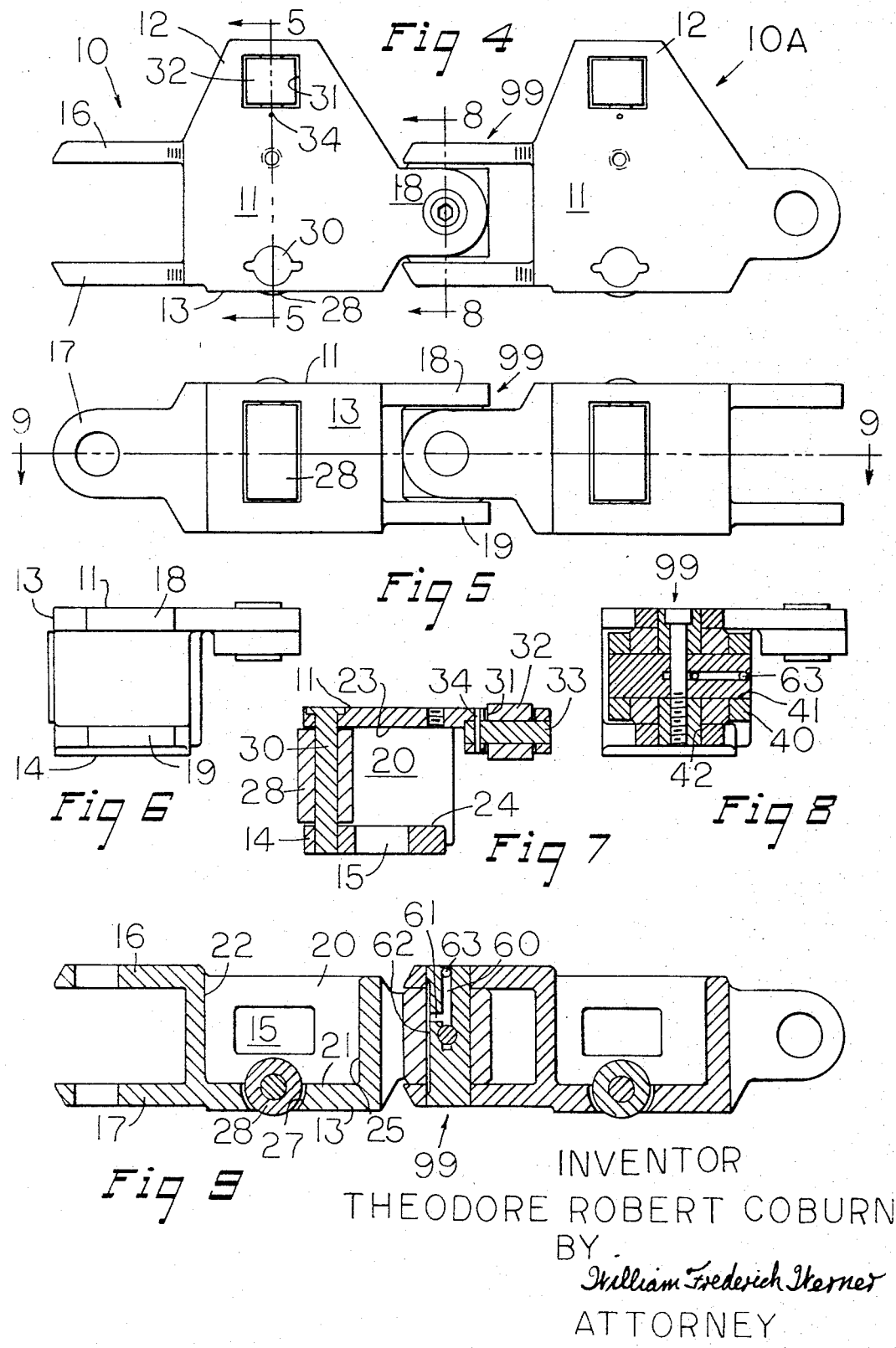

INVENTOR
THEODORE ROBERT COBURN
BY
*William Frederick Werner*
ATTORNEY

United States Patent Office 3,418,702
Patented Dec. 31, 1968

3,418,702
TENTER CLIP CHAIN
Theodore Robert Coburn, Coventry, R.I., assignor to Bevis Industries, Inc., Providence, R.I., a corporation of Florida
Filed Oct. 8, 1965, Ser. No. 494,137
3 Claims. (Cl. 26—61)

ABSTRACT OF THE DISCLOSURE

A tenter clip chain comprising universal joints interconnecting base members of adjacent tenter clips, each clip being adapted to be drivable from two different directions by sprockets lying in two different planes.

This invention relates to tenter clip chains and more particularly to universally jointed tenter clip chains adapted to travel in a horizontal plane, a vertical plane and in a combination of both a horizontal and vertical plane.

In the prior art and in common practice in tentering, two types of tenter frames were employed, as for example, frames having horizontal rails and frames with vertical rails. Each of these frames required separate and structurally different types of tenter clip chains.

A tenter is a conveyor comprising two separate chains each link of which is formed as part of a clip, these being simultaneously operated to grip a web of material along opposite parallel edges. The medial area of the web is unsupported but held taut by the oppositely disposed tenter clips forming the chains. The tenter clips constituting the chains are held in spaced relation and are guided by means such as guide rails; vertical guide rails or horizontal guide rails as the nature of the tentering function dictates.

The guide rails combined with the teeth on the sprocket wheels which drive and guide the tenter clip chains to greatly limit the free movement and flexibility of the joint between adjacent tenter clips.

Accordingly, it is an object of the present invention to provide a structurally new base member and a new joint between adjacent base members of tenter clips, wherein the proper movement and flexibility between clips permits sprocket wheels to drive the clips in either a vertical plane or a horizontal plane or in a combination of the two planes for operation in atmospheres remote from a hot oven or in cooperation with various types of guide rails.

Another object of the present invention is to provide a joint between tenter clips which is lubricated to reduce wear, reduce friction and permit the tenter chain to operate more efficiently and at higher speeds.

Still another object of the present invention is to provide a stronger and improved joint between adjacent tenter clips, as for example, a joint which prevents justapositioning between adjacent tenter clips.

Other objects of the present invention will become apparent in part and be pointed out in part in the following specification and claims.

Referring to the drawings in which similar characters of reference refer to like parts:

FIGURE 4 is a plan view of two tenter clip bases united by means of the new tenter clip joint.

FIGURE 5 is a front elevational view of FIGURE 4.

FIGURE 6 is a right hand end view of FIGURE 4.

FIGURE 7 is a vertical cross sectional view taken along line 5—5 of FIGURE 4.

FIGURE 8 is a vetrical cross sectional view through the new joint, taken on line 8—8 of FIGURE 4.

FIGURE 9 is a vertical cross sectional view taken on line 9—9 of FIGURE 5.

In proceeding with this invention, reference is made to the drawings, wherein the tenter chain comprises a plurality of tenter clips. Each clip comprises a base, a superstructure, and arms which project sideways on opposite sides of the base.

In some tenter clips the superstructure and base are integrally formed. In other tenter clips the base with its sideways projecting arms forms an independent unit to which various types of superstructure may be attached. This "two piece" tenter clip is herein used, by way of example, and not limitation, and for clarity of illustration.

Figure 13:
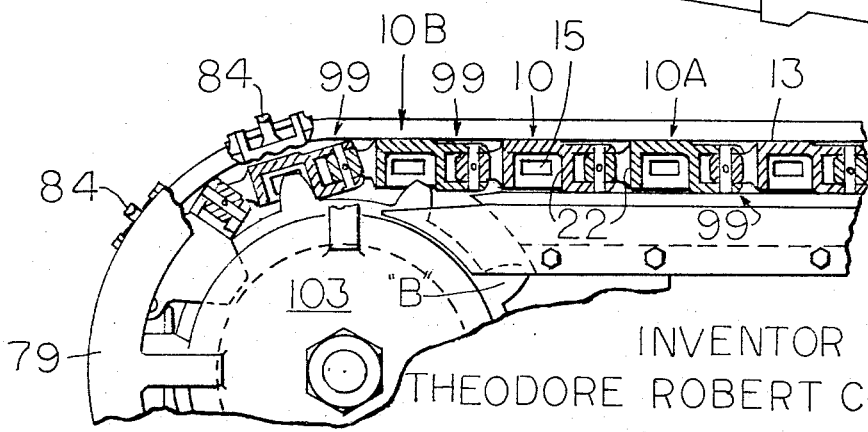
FIGURE 13 is a fragmentary plan view partially in section to show a sprocket tooth engaging a new tenter clip base and the flexing of the new joint in one direction.

Reference is now made to FIGURES 4 thru 10. The base members are generally indicated by reference numerals 10, 10A, 10B, etc., and each base is provided with a horizontal platform 11 having a tail section 12, an integrally formed vertical front face 13 and bottom 14. Bottom 14 is provided with a vertical sprocket tooth cavity 15, a pair of horizontally projecting but vertically disposed parallel arms 16, 17, and a pair of horizontally projecting and horizontally disposed parallel arms 18, 19. Base 10 is provided with a chamber 20 defined by front wall 21, side wall 22, top 23, bottom wall 24 and rib 25. Chamber 20 is adapted to accommodate a horizontal sprocket tooth. The sprocket tooth will engage, side wall 22 (see FIGURES 9 and 13).

A tenter clip constructed in accordance with the preceeding description would travel in the tenter frame guide rail with front face 13 slidingly engaging the guide rail and with tail section 12 slidingly engaging the top case.

In order to reduce friction between front face 13 and tail section 12 slidingly engaging the guide rail and top case, respectively, two rollers are provided. Front face 13 and front wall 21 and the material therebetween is recessed at 27 to accommodate a roller 28 (see FIGURES 7 and 9) which projects beyond front face 13 in order to engage the guide rail. As seen in FIGURE 7, a T-headed pin 30 is located in horizontal platform 11 and bottom 14 in a space provided for that purpose. Roller 28 is rotatively mounted upon pin 30. The superstructure overlies the head of T-headed pin 30 and thereby holds pin 30 in position.

Tail section 12 is provided with a window 31 adapted to accommodate a roller 32 rotatively mounted upon a pin 33 located in tail section 12 and fastened therein by means of a dowel 34. Roller 32 projects above horizontal platform 11 so as to engage the top case.

The new and improved universal joint, generally indicated at 99 (FIGURE 10), and located between adjacent base members 10, 10A, will now be described. It consists of a universal joint body 40 provided with a horizontal bearing 41 and a vertical bearing 42 located at right angles to said horizontal bearing 41. A vertical movement pintle 43 provided with a vertical bore 44 is mounted in horizontal bearing 41. An upper bushing 45 provided with a pintle bearing surface 46 is mounted in vertical bearing 42 and upon vertical movement pintle 43. Similarly, a lower bushing 47 provided with a pintle bearing surface 48 is mounted in vertical bearing 42 and upon vertical movement pintle 43. A horizontal pintle swivel pin 50 provided with a head 51 and screw threads 52 passes through upper bushing 45, vertical bore 44 and into lower bushing 47 where screw threads 52 are rotatively mated with screw threads for the purpose of fastening upper bushing 45 and lower bushing 47 to vertical movement pintle 43 in a swivel action condition. Upper bushing 45 is provided with a countersunk area adapted to accommodate head 51.

Horizontally disposed parallel arms 18, 19 are respectively, provided with swivel pin bearings 55, 56. Vertically disposed parallel arms 16, 17 are, respectively provided with vertical movement pintle bearings 57, 58. Upper bushing 45 is mounted in swivel pin bearing 55 and lower bushing 47 is mounted in swivel pin bearing 56. Vertical movement pintle 43 is rotatively mounted on opposite ends, respectively, in vertical pintle bearings 57, 58. The net result of the structure just described is a universal joint between base 10 and base 10A of adjacent tenter clips.

When it is so desired vertical movement pintle 43 may be provided with an axial passageway 60 (see FIGURES 8, 9 and 10), an exit bore 61, and a grease groove 62. A lube ball 63 may be accommodated in axial passageway 60, so that, a grease gun (not shown) may place a shot of grease in axial passageway 60 whereby the grease may exit through bore 61 into grease groove 62 to thereby lubricate vertical movement pintle 43, pintle bearing surfaces 46, 48, vertical pintle bearings 57, 58, and pintle bearings 55, 56.

Figure 11:
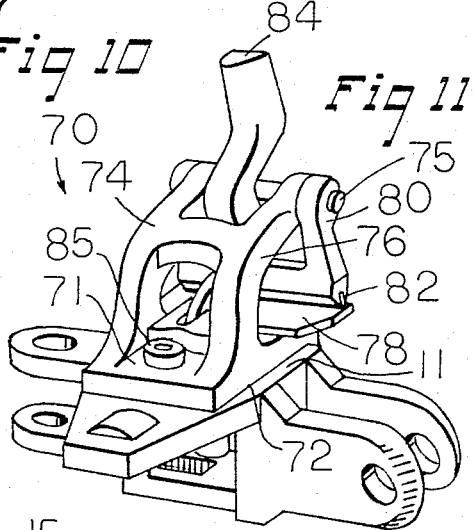
FIGURE 11 is a perspective view of a tenter clip jaw fastened to a tenter clip base, thereby forming a tenter clip.

FIGURE 11 illustrates one form of a material gripping element; generally indicated by reference numeral 70, which comprises a superstructure having a body member 71 provided with a horizontally disposed seat 72, and a pair of vertically upstanding arms 74, 76 which project forwardly, to overlie body member 71 in spaced relation. Secured to body member 71 is a gripping plate 78 and pivotally mounted about arms 74, 76 upon a pintle 75 is a jaw 80 having an inserted strip 82 at its lower edge between which and the plate 78 the edge of the cloth (not shown) is gripped as the tenter clip chain moves along guided by a rail. When the tenter chain reaches a sprocket 103 (see FIGURES 1 and 13) at the delivery end of the rail a suitable cam 79 engages an upstanding arm 84 of the pivoted jaw 80 causing the latter to swing away from gripping plate 78 thereby releasing the cloth.

Horizontally disposed seat 72 lies upon and is removably fastened to horizontal platform 11 by means of a bolt 85 secured in screw threads 86 located in base 10 for that purpose.

Figure 12:
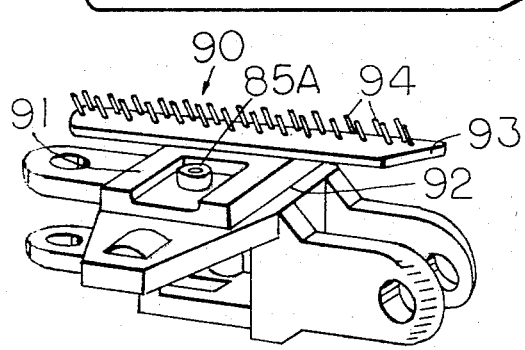
FIGURE 12 is a perspective view of a pin plate fastened to a tenter clip base, thereby forming a tenter clip.

FIGURE 12 illustrates another form of a material gripping element known as a "pin plate," and generally indicated by reference numeral 90, which comprises a body member 91 provided with a horizontally disposed seat 92 and a plate 93 provided with a plurality of pins 94. Horozontally disposed seat 92 lies upon and is removably fastened to horizontal platform 11 by means of bolt 85A secured to screw threads 86.

Figure 1:
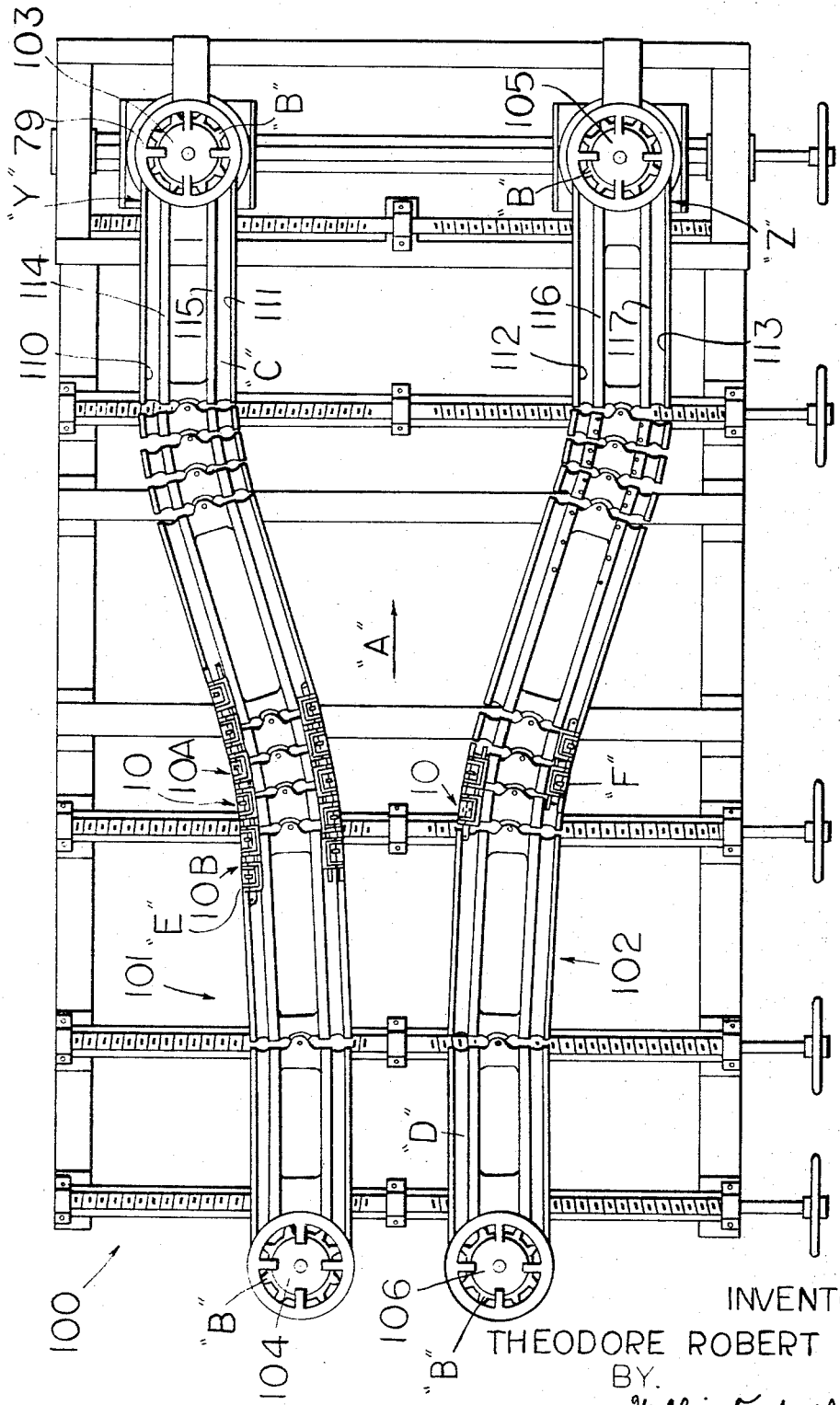
FIGURE 1 is a plan view of a tenter frame having oppositely disposed horizontal guide rails provided with tenter clip chains guided therein.

In operation, a horizontal tentering frame, generally indicated by reference numeral 100 in FIGURE 1, will be provided with oppositely disposed and simultaneously operated tenter clip chains, generally indicated at 101 and 102. Each tenter clip chain 101 and 102 will constitute a plurality of base members 10, 10A, 10B, etc. Each base member 10 will be pivotally attached to the adjacent base member 10A, 10B, on opposite sides thereof, by means of a universal joint 99.

Tentering frame 100 comprises-in-part two sets of sprockets 103, 104 and 105, 106. Sprockets 103, 105 are drive sprockets and sprockets 104, 106 are idler sprockets when the material is traveling in the direction of arrow A. The tenter clip chain 101 is mounted upon sprockets 103, 104 and the tenter clip chain 102 is mounted upon sprockets 105, 106. The teeth B of sprockets 103, 104, 105, 106 engage the side wall 22 of horizontal sprocket tooth chamber 20 of the base members 10, 10A, 10B, etc., to thereby drive and guide said base members.

The tenter clip chains 101, 102 are taut in the length between sprockets 104, 103 and 106, 105 due to the pull exerted by the sprockets 103 and 105. The pull sides of the tenter clip chains 101, 102 are indicated at C and D, respectively. The slack sides of the tenter clip chains 101, 102 are indicated at E and F, respectively. The greatest slack in the tenter clip chains 101, 102 is at points Y and Z, respectively. It is at these points Y and Z, that buckling or juxtapositioning of the tenter clip chains is apt to occur. The present universal joint 99 is directed to prevent this buckling or juxtapositioning.

Tenter frame 100 also constitutes guide rails having guide rail surfaces 110, 111 and 112, 113 and top cases 114, 115, 116, 117. Base members 10, 10A, 10B, ride in the guide rails. Front face 13 and/or roller 28 will engage the guide surfaces 110, 111 or 112, 113. Top cases 114, 115 will engage tail sections 12 and/or rollers 32, of the body members 10, 10A, etc., constituting chain 101 and top cases 116, 117 will engage tail sections 12 and/or rollers 32 of the body members 10, 10A, constituting chain 102.

Figure 2:
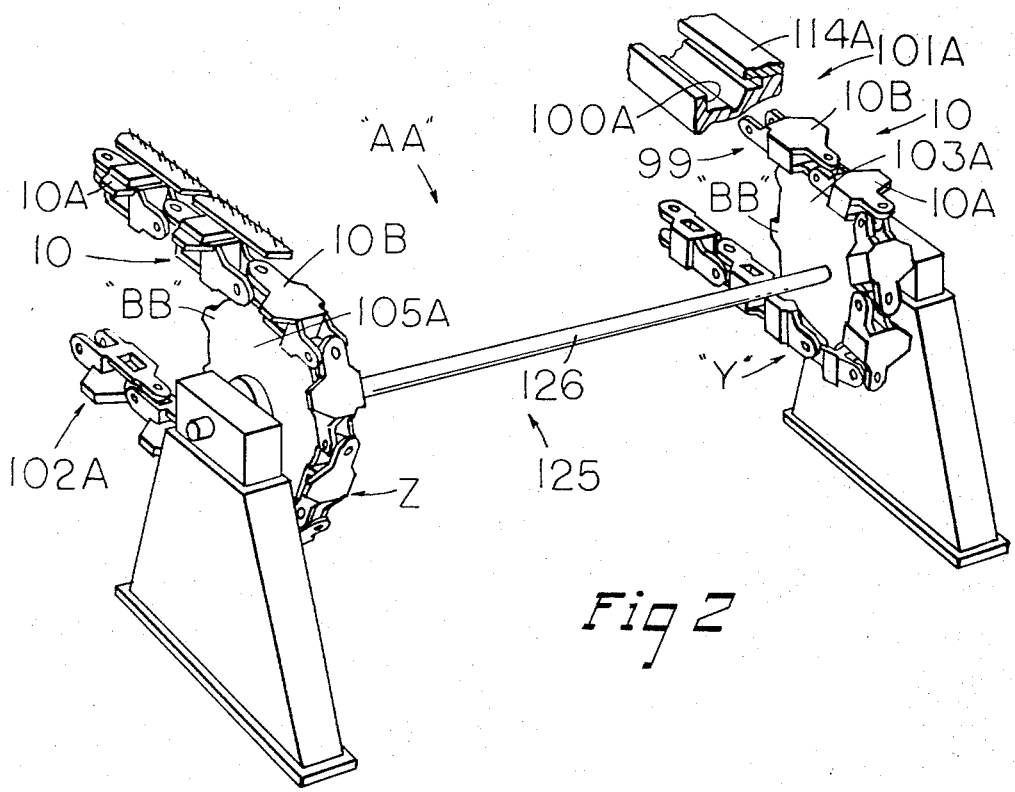
FIGURE 2 is a schematic perspective view of a tender frame having oppositely disposed vertical guide rails provided with tenter clip chains guided therein.

FIGURE 2 schematically illustrates a vertical tentering frame, generally indicated at 125. Drive sprockets 103A and 105A are mounted to be driven upon a drive shaft 126. The cloth is travelling in the direction of the arrow AA. The vertical tentering frame 125 and the horizontal tentering frame 100 constitute substantially, the same construction and function in substantially the same way. Oppositely disposed and simultaneously operated tenter clip chains are generally indicated at 101A and 102A. Each tenter chain 101A, 102A and 101, 102 constitutes a plurality of base members 10, pivotally attached to adjacent members 10A, 10B on opposite sides thereof by means of universal joint 99.

The teeth BB will engage vertical sprocket tooth cavity 15 to drive the base members 10, 10A, etc. The greatest slack in tenter clip chains 101A and 102A is at points Y and Z where the tooth BB leaves the vertical sprocket tooth cavity 15 and the cavity 15 becomes disengaged from a tooth BB. As previously mentioned for tenter frame 100 buckling of adjacent tenter clips 10, 10A, takes place. The universal joint 99 not only allows the same base members to be used in both a horizontal tentering frame and a vertical tentering frame but the joint also prevents buckling or juxtapositioning between base members 10, 10A so as to prevent a base member from jumping out of engagement with the sprocket wheel teeth B and/or BB.

Figure 3:
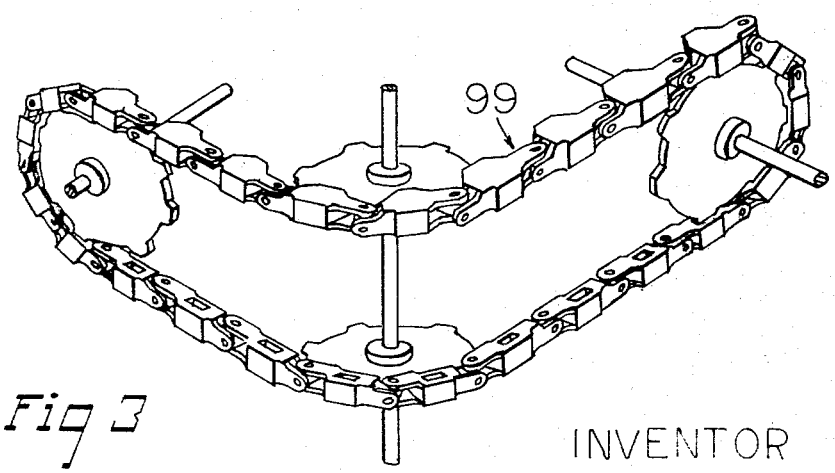
FIGURE 3 is a schematic perspective view showing the new tenter clip chain driven both in a horizontal and a vertical direction.
Figure 10:
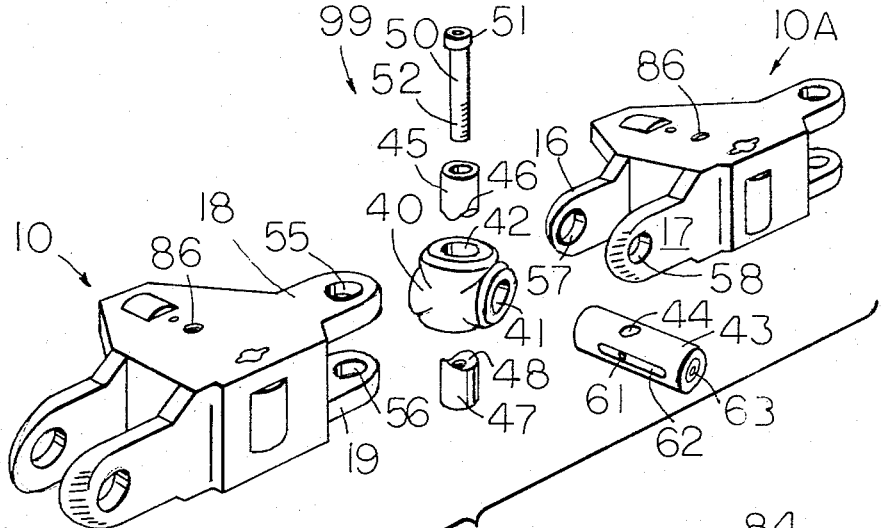
FIGURE 10 is an exploded perspective view of two tenter clip bases and the new joint which unites them.

In addition as illustrated schematically in FIGURE 3, universal joint 99 permits the tenter clip chain to be driven in two planes, simultaneously. In this manner a tenter clip chain may be operated in a preselected distance away from the tenter frame and guide rails, when such travel of the tenter clip chain is desired.

Tenter frame 125 also comprises guide rails; only one being illustrated in FIGURE 2 at 100A, and one top case 114A is shown, it being understood that each chain 101A and 102A rides in a guide rail and is held in travel position by top cases.

Having shown and described preferred embodiments of the present invention, by way of example, it should be realized that structural changes could be made and other examples given without departing from either the spirit or scope of this invention.

What I claim is:

1. A tenter link comprising a base member provided with a horizontal platform, a superstructure provided with material holding means, means fastening said superstructure to said horizontal platform, a vertical front face, a bottom having a vertical sprocket tooth cavity, a chamber having a horizontal sprocket tooth engaging surface, a pair of horizontally projecting but vertically disposed parallel arms having means for engagement with a horizontal pintle, a pair of horizontally projecting and horizontally disposed parallel arms having means for engagement with a vertical pintle, said vertical front face being adapted to slidably engage a guide rail, said horizontal platform having a tail section adapted to slidingly engage a top case, said tenter link being adapted to be driven from two different directions by sprocket wheels lying in two different planes through, respectively, said vertical sprocket tooth cavity, and said horizontal sprocket tooth engaging surface.

2. A tenter link comprising a base member provided with a horizontal platform, a superstructure provided with material holding means, means fastening said superstructure to said horizontal platform, a vertical front face, a bottom having a vertical sprocket tooth cavity, a chamber having a horizontal sprocket tooth engaging surface, a pair of horizontally projecting but vertically disposed parallel arms having means for engagement with a horizontal pintle, a pair of horizontally projecting and horizontally disposed parallel arms having means for engagement with a vertical pintle, said vertical front face having a recess, said horizontal platform having a window, a first roller, means rotatively mounting said first roller to said base member with said first roller located in said recess and projecting beyond said vertical front face to be adapted to engage a guide rail, a second roller, means rotatively mounting said second roller to said base member and in said window and projecting above said horizontal platform to be engageable with a top case.

3. A tenter link comprising a base member provided with a horizontal platform having a tail section adapted to engage a top case, a superstructure provided with material holding means, means fastening said superstructure to said horizontal platform, a vertical front face adapted to engage a guide rail, a bottom having a vertical sprocket tooth cavity, a chamber having a horizontal sprocket tooth engaging surface, said tenter link being adapted to be driven from two different directions by sprocket wheels lying in two different planes through, respectively, said vertical sprocket tooth engaging surface and said horizontal tooth cavity, a pair of horizontally projecting but vertically disposed parallel arms having pintle engaging means, a pair of horizontally projecting and horizontally disposed parallel arms having swivel pin engaging means, and a universal joint consisting of a body provided with both a horizontal bearing and a vertical bearing, a vertical movement pintle provided with a vertical bore mounted in said horizontal bearing, said vertical movement pintle rotatively engaging said pintle engaging means on said horizontally projecting and vertically disposed parallel arms, an upper bushing provided with a pintle bearing surface rotatively mounted in said vertical bearing and upon said vertical movement pintle, a lower bushing provided with a pintle bearing surface rotatively mounted in said vertical bearing and upon said vertical movement pintle, a horizontal swivel pin located in said upper bushing, said vertical bore and lower bushing, means fastening said swivel pin to said lower bushing, said upper bushing and said lower bushing being adapted to rotatively engage swivel pin engaging means on horizontally projecting and horizontally disposed parallel arms of an adjacent body member.

References Cited

UNITED STATES PATENTS

| | | | |
|---|---|---|---|
| 2,118,348 | 5/1938 | Hoeffleur | 74—246 XR |
| 2,365,866 | 12/1944 | Dalrymple | 74—246 |
| 568,508 | 9/1896 | Arnold | 26—61 X |
| 1,085,538 | 1/1914 | Burgess et al. | |
| 1,478,454 | 12/1923 | Renold | 26—61 |
| 2,437,967 | 3/1948 | Nash | 26—61 |
| 2,439,569 | 4/1948 | Hathorn | 64—17 |
| 2,977,776 | 4/1961 | Quinn | 64—17 |
| 3,058,191 | 10/1962 | Nash | 26—62 |
| 3,103,798 | 9/1963 | Piatti | 64—17 |
| 3,300,258 | 1/1967 | Kompanek et al. | 64—17 X |

FOREIGN PATENTS

| | | |
|---|---|---|
| 4,819 | 1876 | Great Britain. |
| 11,434 | 1907 | Great Britain. |

ROBERT R. MACKEY, *Primary Examiner.*

U.S. Cl. X.R.

26—57, 62; 64—17